(12) United States Patent
Geiger

(10) Patent No.: US 7,219,599 B2
(45) Date of Patent: May 22, 2007

(54) COFFEE MACHINE

(75) Inventor: Rudolf Geiger, Lauterstein-weissenstein (DE)

(73) Assignee: WMF Wuerttembergische Mettwarenfabrik AG, Geislingen/Steige (DE)

( * ) Notice: Subject to any disclaimer, the term of this patent is extended or adjusted under 35 U.S.C. 154(b) by 458 days.

(21) Appl. No.: 10/753,263

(22) Filed: Jan. 7, 2004

(65) Prior Publication Data
US 2004/0159242 A1 Aug. 19, 2004

(30) Foreign Application Priority Data
Jan. 23, 2003 (EP) .................... 03001341

(51) Int. Cl.
*A47J 31/46* (2006.01)
(52) U.S. Cl. .................... 99/299; 99/302 R; 99/307
(58) Field of Classification Search ............ 99/290, 99/299, 307, 306, 302 R, 284
See application file for complete search history.

(56) References Cited

U.S. PATENT DOCUMENTS 6,382,083 B2 * 5/2002 Schmed .................... 99/289 R
6,739,240 B2 * 5/2004 De Koning et al. .......... 99/283
6,829,981 B2 * 12/2004 Lassota ...................... 99/299

FOREIGN PATENT DOCUMENTS

EP 0862883 A1 9/1998
EP 1133944 A2 9/2001

* cited by examiner

*Primary Examiner*—Reginald L. Alexander
(74) *Attorney, Agent, or Firm*—Marshall, Gerstein & Borun LLP

(57) ABSTRACT

A coffee machine (1) for preparing at least a first coffee beverage at a first brewing pressure and at least a second coffee beverage at a second brewing pressure, the second brewing pressure being higher than the first brewing pressure. The coffee machine is provided with a brewing means (5) which is connected via an outlet line (9) to a tap opening (1). A throttle means (12, 112) is provided in the outlet line (9) and is adjustable between a first and a second flow cross-section, the first flow cross-section being greater than the second flow cross-section. To simplify such a coffee machine in a constructionally simple way in terms of control, the throttle means (12, 112) is made adjustable by the action of the brewing pressure.

8 Claims, 3 Drawing Sheets

COFFEE MACHINE

FIELD OF THE INVENTION

The present invention relates to a coffee machine that dispenses different types of coffee beverages.

BACKGROUND OF THE INVENTION

Such a coffee machine is known from EP 862 883 A. The known coffee machine belongs to those coffee machines that are able to make and dispense at least two different types of coffee beverages, especially coffee beverages of the filter coffee type and coffee beverages of the espresso type. Apart from the use of preferably different types of coffee beans, these two types of coffee beverages differ from one another by a different brewing pressure, the coffee beverages of the filter coffee type being prepared under atmospheric pressure up to a slight overpressure of up to 1.5 bar, whereas coffee beverages of the espresso type need a higher pressure, i.e. one above or even clearly above 1.5 bar to about 7.5 bar. Beverages of the espresso type are only accepted by consumers if they have a very distinct, fine-pored and stable foam layer, the so-called "crema". To this end such coffee beverage that is brewed at an increased pressure is passed in the known coffee machine through a flow path having a reduced cross-section. On the other hand, it is convenient for the consumers when both types of coffee beverages are discharged through the same tap opening, so that the user cannot put the cup or pot under the wrong outlet by mistake. In the known coffee machines, this problem is solved by interposing a device into the outlet line between brewing means and tap opening, said device reducing the outlet cross-section when coffee beverage of the espresso type is brewed, and releasing again the full cross-sectional area of the outlet when coffee beverage of the filter coffee type is brewed. This device is driven in the known coffee machine by a motor which requires additional control efforts.

SUMMARY OF THE INVENTION

It is the object of the present invention to develop a coffee machine of the above-mentioned type such that the control efforts are reduced in a constructionally simple way.

The configuration of the coffee machine according to the invention exploits the fact that the different types of coffee beverages are prepared at different brewing pressures, and it is ensured that said different brewing pressures also act on the throttle means according to the invention. The throttle means is thereby actuated by the brewing pressure itself, so that no additional motor has to be provided.

BRIEF DESCRIPTION OF THE DRAWING

Embodiments of the invention are now explained in more detail with reference to the drawings, in which.

DETAILED DESCRIPTION OF THE INVENTION

Figure 1:
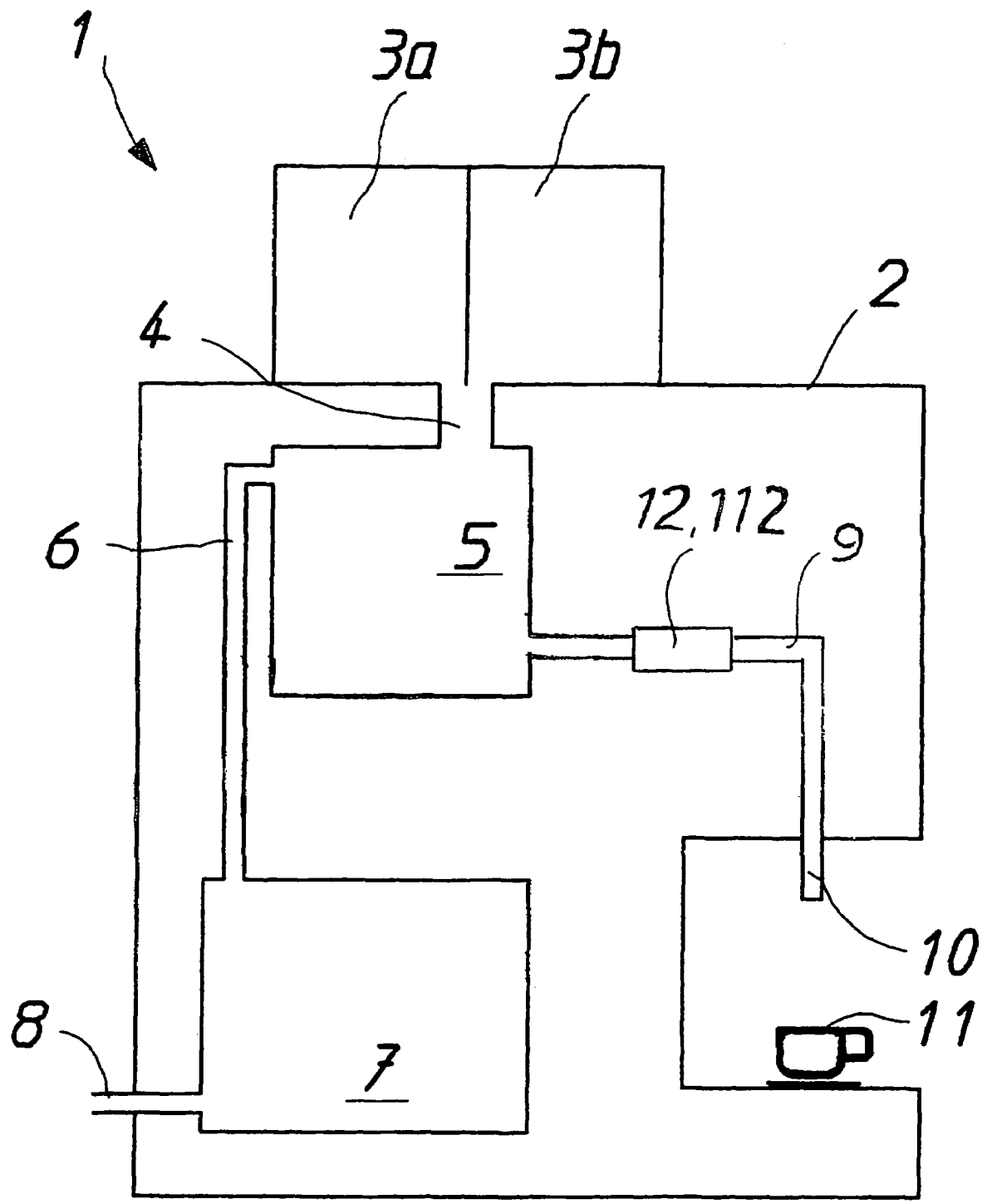
FIG. 1 is a schematic view illustrating the components of a coffee machine that are essential for the invention.

FIG. 1 is a schematic view illustrating a coffee machine 1 which is capable of preparing at least two different types of coffee beverages made at clearly different brewing pressures. For instance, it is possible to make a first coffee beverage under atmospheric pressure or at a slight overpressure of up to 1.5 bar, which yields a coffee beverage of the filter coffee type. A second coffee beverage, especially a coffee beverage of the espresso type, is made at an increased pressure of more than 1.5 bar up to 7.5 bar.

The coffee machine 1 includes a housing 2 having preferably provided thereon two reservoirs 3a and 3b for storing different coffee beans for the different types of coffee beverages. The reservoirs 3a, 3b communicate with a brewing means 5 via a hopper 4 which is provided with a dosing device (not shown), if necessary. The brewing means 5 may be of the type capable of preparing two or even more types of coffee beverages. However, it is also possible to provide a separate brewing means for each type of coffee beverage.

The brewing means 5 is supplied with water via a water line 6 which is connected either to a boiler and water tank or, as shown, via a water heater 7 (boiler or instantaneous water heater) and an inlet 8 to the water mains.

The brewing means 5 issues—via an outlet line 9 shared by the two types of coffee beverages—in a joint tap opening 10 below which a vessel, represented by a cup 11, can be put. Furthermore, there are selection keys or switches (not shown) and a control means via which the user can preselect the desired coffee beverage in the desired amount.

A throttle means 12, 112 is provided in the outlet line 9 such that it is acted upon by the different brewing pressures from the brewing means 5.

A first embodiment of such a throttle device 12 is described with reference to FIGS. 2 and 3.

The throttle device 12 has a substantially cylindrical housing 13 with an inlet member 26 and a nozzle member 27 with a flow passing therethrough in axial direction. To this end an inlet 14 is provided in the inlet member 26 on a face of the housing 13 and an outlet 15 in the nozzle member 27 on the opposite face of the housing 13 facing the tap opening 10.

In the interior of the housing 13, a piston 16 is supported in axially displaceable manner, the piston being provided at its side facing the inlet 14 with a first piston member 16a and at its side facing the outlet 15 with a second piston member 16b. The first piston member 16a is substantially cup-shaped and is oriented with its opening towards the inlet 14. The surface 17 facing the inlet 14 forms a piston surface for operating the piston 16. The second piston member 16b is essentially shaped as a cylinder and includes a flange 18 on which a spring 19 is supported. The spring 19 is supported at its other side on an abutment 20 on the nozzle member 27, the abutment being provided near the outlet opening 15. The spring 19 is designed as a motion means which presses the piston 16 towards the inlet 14. To this end the spring 19 is designed as a helical compression spring.

The cup-shaped piston member 16a has at least in some portions an outer diameter smaller than the inner diameter of the housing 13. Preferably axial grooves, or the like, are provided on the outer circumference of the cup-shaped piston member 16a for creating a flow path 21 along the outer circumference of the cup-shaped piston member 16a, said flow path being connected via openings 21 in the piston member 16a to the inlet 14.

The outer diameter of the cylindrical piston member 16b is smaller than the outer diameter of the cup-shaped piston member 16a, so that on the face of the cup-shaped piston member 16a that is facing the outlet 15, a sealing surface 22 is formed at the transition to the cylindrical piston member 16b. The sealing surface 22 cooperates with a sealing seat 23 which is provided on the nozzle member 27 around the outlet 15. The sealing seat 23 is accommodated in axial direction in the housing in such a way that the cylindrical member 16b of the piston 16 is positioned in, every piston position at a radial distance within the sealing seat 23.

An axial passage 24 which is oriented into the direction of flow and is shaped as a through-hole having an area 24a with a larger inner diameter and an area 24b with a smaller inner diameter extends through both piston members 16a, 16b. The area 24b with the small diameter issues at the side facing the outlet 15 from the cylindrical piston member 16b and is formed as a nozzle. The area 24a with the larger diameter issues from the piston surface 17 and defines said surface to the inside. Reference numeral 25 designates sealing rings.

Figure 2:
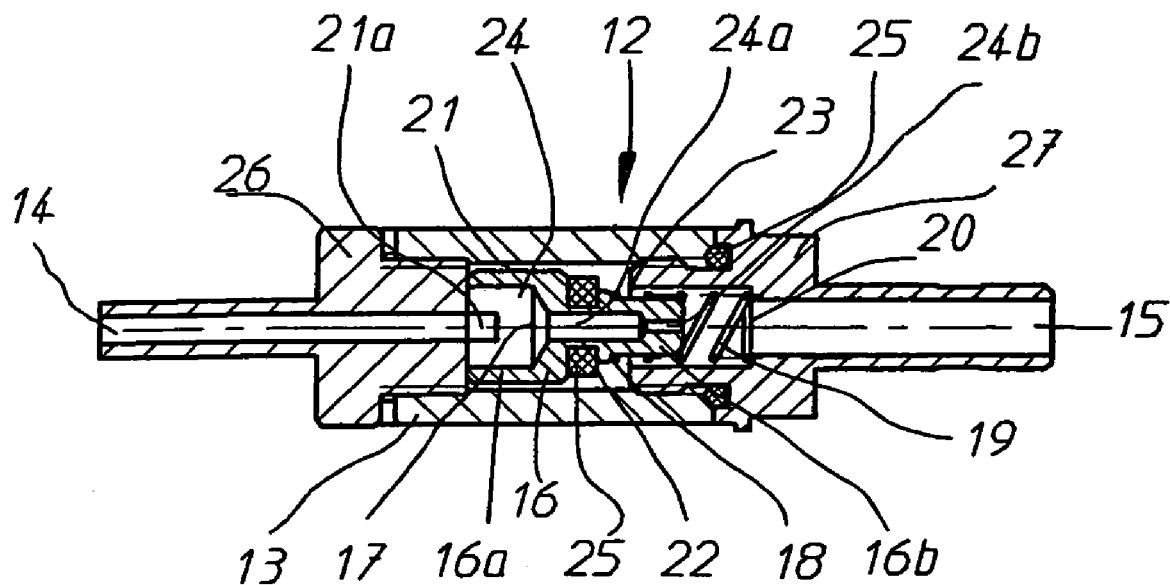
FIG. 2 is a schematic view showing a first throttle device in section.

In the position shown in FIG. 2, the piston 16 is pressed by the spring 19 acting as a motion means for the piston 16 against a stop at the inlet member 26. In this position, flow medium, i.e. the appropriate coffee beverage, can pass via the openings 21a in the cup-shaped piston member 16a into the flow path 21 and flow from there, past the sealing seat 23, into the distance which is provided between the cylindrical piston member 16b and the sealing seat 23, and in which the spring 19 is accommodated, and then passes into the outlet 15. Likewise, flow medium can pass through the permanently open passage 24 into the outlet 15, the outlet cross-section in this instance being defined by the open cross-sectional area in the region of the sealing seat 23, i.e. the annular chamber around the cylindrical piston member 16b and the cross-sectional surface of the nozzle-like area 24b of the passage 24. In this position, the piston 16 remains stopped as long as the force of spring 19 is not overcome. The force of spring 19 is preferably such that the piston 16 remains in contact with the abutment 26 as long as the throttle means 12 and the piston 15 are subjected to the pressure that reaches the throttle means 12 during brewing of coffee beverage under low brewing pressure, i.e. coffee beverage of the filter coffee type. This pressure is preferably between atmospheric pressure and 1.5 bar.

Figure 3:
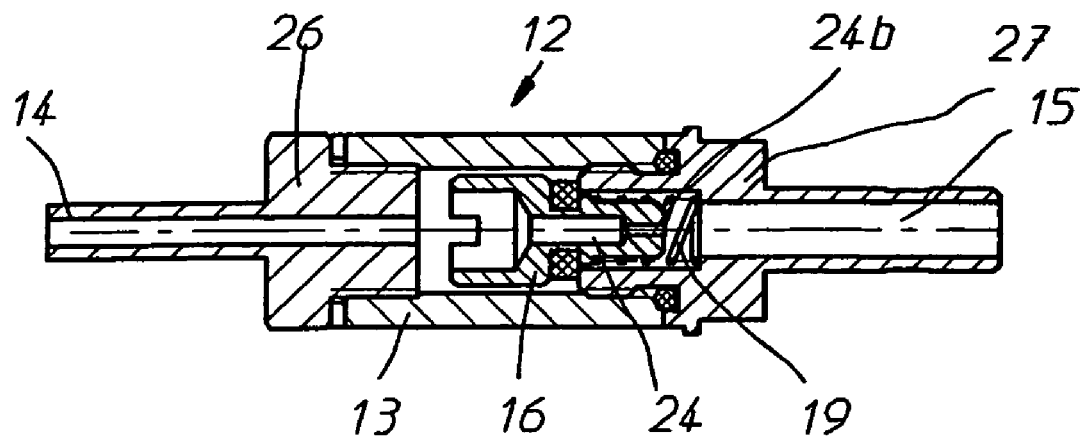
FIG. 3 shows the throttle device according to FIG. 2 in a second position.

When during brewing of the second type of coffee beverage the pressure reaching the throttle mans 12 rises such that the force of spring 19 is overcome, the piston 16 is pressed into the position shown in FIG. 3 towards the outlet 15 until the sealing surface 22 of the cup-shaped piston member 16a rests on the sealing seat 23 of the nozzle member 27. This will block the flow path 21, so that the flow medium, i.e. the coffee beverage of the espresso type, can only flow through passage 24. It is solely the area 24b of the passage 24 narrowed in the manner of a nozzle that forms the reduced outlet cross-section. Hence, with this design it is possible to reduce the outlet cross-section, such a reduction in combination with the increased brewing pressure in the range of more than 1.5 bar to 7.5 bar contributing to the generation of fine-pored stable "crema".

Figure 4:
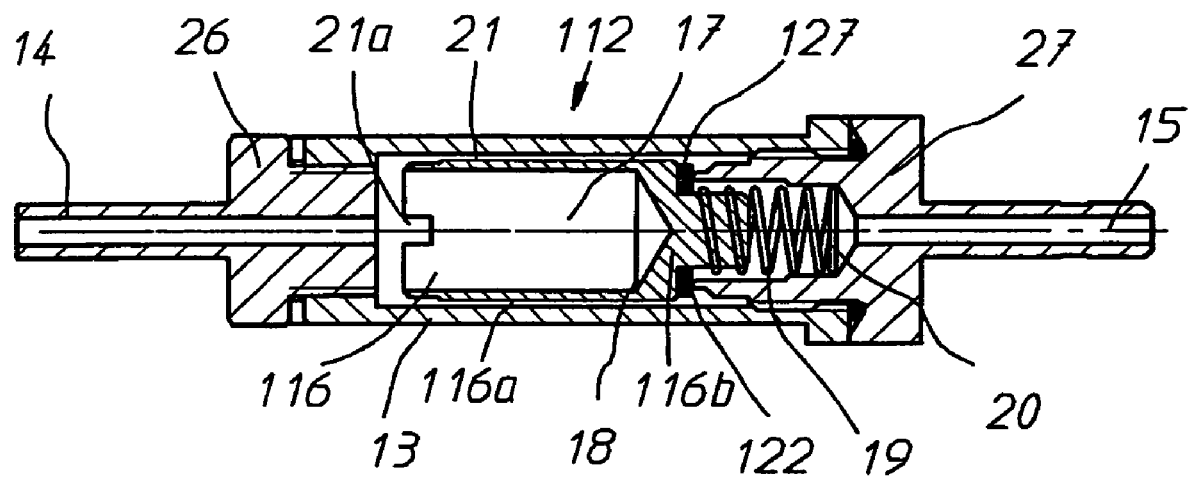
FIG. 4 shows a further embodiment of a throttle device in section.
Figure 5:
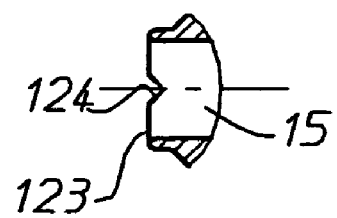
FIG. 5 shows a detail of FIG. 4 on an enlarged scale.

FIGS. 4 and 5 show a further embodiment of a throttle device 112 of the invention; identical or comparable components are marked with the same reference numerals and are not explained again.

The throttle means 112 includes a piston 116 which is again provided with a cup-shaped piston part 116a and a cylindrical piston part 116b that has a smaller outer diameter than the cup-shaped piston part 116a. Spring 19 is equipped with the same elastic force and is again supported on an abutment 20 on the nozzle member 27 and on a flange 18 at the transition between the two piston members 116b and 116a.

The piston 116 is provided at the transition to the cup-shaped piston member 116a and at a side facing the outlet 15 with an annular sealing body 17 which also comprises a planar sealing surface 122 extending in a direction perpendicular to the axis of the piston 116.

The nozzle member 27 has formed around the outlet 15 a sealing seat 123 which is shown on an enlarged scale in FIG. 5 and interrupted by notch-like openings 124. When the piston 116, as shown in FIG. 4, is pressed by the higher brewing pressure with its sealing surface 122 onto the sealing seat 123, the notch-like passage openings 124 form a permanently open passage and define the smaller flow cross-section.

When due to a reduction of the brewing pressure the pressure applied to the piston 116 falls below the value predetermined by the force of spring 19, spring 19 will move the piston 116 up to the stop on the inlet member 26. In this position the coffee beverage can flow through the openings 21a and the flow path 21 into outlet 15, the cross section of the outlet 15 in the area of the sealing seat 123 defining the larger flow cross-section.

In a modification of the above described and illustrated embodiments, the direction of actuation and movement of the throttle means can be reversed kinematically. Instead of the spring, another motion means may be provided for the piston, for instance also a brewing pressure. The two flow cross-sections may also be provided such that they are strictly separated from one another, the smaller flow cross-section forming not part of the larger flow cross-section. Instead of a cup-shaped design, which has a weight-reducing effect, the piston may also be produced as a solid body.

I claim:

1. A coffee machine, comprising:
   a brewing means for preparing at least a first coffee beverage at a first brewing pressure and at least a second coffee beverage at a second brewing pressure, the second brewing pressure being higher than the first brewing pressure, the brewing means being connected via an outlet line to a tap opening;
   a throttle means which is provided in the outlet line and which is adjustable between a first flow cross-section and a second flow cross-section, the first flow cross-section being greater than the second flow cross-section, and the throttle means being adjustable by the action of the brewing pressure, wherein the throttle means includes:
   a piston with a piston surface and a sealing surface, the piston surface adapted to be actuated by the brewing pressure for moving the piston in one direction and the sealing surface adapted to close the larger flow cross-section, and
   a motion means for moving the piston in a direction that is opposite to the one direction.

2. The coffee machine according to claim 1, wherein the throttle means is adjustable by the second brewing pressure.

3. The coffee machine according to claim 1, wherein the motion means includes a spring having a force greater than the first brewing pressure exerted on the throttle means, but smaller than the second brewing pressure.

4. The coffee machine according to claim 1, wherein the piston provides a passage defining the second flow cross-section.

5. The coffee machine according to claim 1, wherein the second flow cross-section is defined by a permanently open passage and the first flow cross-section by the permanently open passage and a closable flow path surrounding the permanently open passage.

6. The coffee machine according to claim 1, wherein the throttle means includes a housing having an inlet and an outlet in which the piston is movable with the piston surface facing the inlet and with the sealing surface facing the outlet, the sealing surface engageable with a sealing seat to at least partially define the first flow cross-section, a flow path being provided between the inlet and the sealing seat between the outer surface of the piston and the inner surface of the housing.

7. The coffee machine according to claim 4, wherein the passage is a through-hole extending through the piston.

8. The coffee machine according to claim 4, wherein the passage is formed by at least one passage opening between a sealing surface provided on the piston and an associated sealing seat.

* * * * *

UNITED STATES PATENT AND TRADEMARK OFFICE
CERTIFICATE OF CORRECTION

| | | |
|---|---|---|
| PATENT NO. | : 7,219,599 B2 | Page 1 of 1 |
| APPLICATION NO. | : 10/753263 | |
| DATED | : May 22, 2007 | |
| INVENTOR(S) | : Rudolf Geiger | |

It is certified that error appears in the above-identified patent and that said Letters Patent is hereby corrected as shown below:

On The Title Page:

Item (75), 1st named inventor, "weissenstein" should be -- Weissenstein --.

Item (73), "Mettwarenfabrik" should be -- Metallwarenfabrik --.

Item (30), "03001341" should be -- 03001341.1 --.

Signed and Sealed this

Seventh Day of August, 2007

JON W. DUDAS
*Director of the United States Patent and Trademark Office*